US011164077B2

(12) United States Patent
Düll et al.

(10) Patent No.: US 11,164,077 B2
(45) Date of Patent: Nov. 2, 2021

(54) RANDOMIZED REINFORCEMENT LEARNING FOR CONTROL OF COMPLEX SYSTEMS

(71) Applicants: Siemens Aktiengesellschaft, Munich (DE); Siemens Energy, Inc., Orlando, FL (US)

(72) Inventors: Siegmund Düll, Munich (DE); Kai Heesche, Munich (DE); Raymond S. Nordlund, Orlando, FL (US); Steffen Udluft, Eichenau (DE); Marc Christian Weber, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1036 days.

(21) Appl. No.: 15/801,582

(22) Filed: Nov. 2, 2017

(65) Prior Publication Data

US 2019/0130263 A1  May 2, 2019

(51) Int. Cl.
*G06N 3/08* (2006.01)
*F02C 9/00* (2006.01)
(Continued)

(52) U.S. Cl.
CPC .............. *G06N 3/08* (2013.01); *F02C 9/00* (2013.01); *G05B 13/0265* (2013.01);
(Continued)

(58) Field of Classification Search
None
See application file for complete search history.

(56) References Cited

U.S. PATENT DOCUMENTS 8,447,706 B2 *  5/2013  Schneegaß .......... G05B 13/027
706/12
2007/0234781 A1  10/2007  Yamada et al.
(Continued)

FOREIGN PATENT DOCUMENTS

CN    101046683 A    10/2007
CN    101573667 A    11/2009
(Continued)

OTHER PUBLICATIONS

Schaefer et al., A Neural Reinforcement Learning Approach to Gas Turbine Control, Proceedings of International Joint Conference on Neural Networks, Orlando, Florida, USA, Aug. 12-17, 2007; Total pp. 6 (Year: 2007).*

(Continued)

*Primary Examiner* — Alan Chen
(74) *Attorney, Agent, or Firm* — Schmeiser, Olsen & Watts LLP

(57) ABSTRACT

A method of controlling a complex system and a gas turbine being controlled by the method are provided. The method comprises providing training data, which training data represents at least a portion of a state space of the system; setting a generic control objective for the system and a corresponding set point; and exploring the state space, using Reinforcement Learning, for a control policy for the system which maximizes an expected total reward. The expected total reward depends on a randomized deviation of the generic control objective from the corresponding set point.

14 Claims, 3 Drawing Sheets

(51) Int. Cl.
  *G05B 13/02* (2006.01)
  *G06N 20/00* (2019.01)
(52) U.S. Cl.
  CPC .... *F05D 2270/30* (2013.01); *F05D 2270/709* (2013.01); *G06N 20/00* (2019.01)

(56) References Cited

U.S. PATENT DOCUMENTS

| | | | |
|---|---|---|---|
| 2010/0070098 | A1 | 3/2010 | Sterzing et al. |
| 2010/0241243 | A1 | 9/2010 | Hans et al. |
| 2013/0325776 | A1 | 12/2013 | Ponulak et al. |
| 2017/0032245 | A1* | 2/2017 | Osband .................. G06N 3/08 |
| 2017/0323195 | A1* | 11/2017 | Crawford ................ G06N 3/08 |
| 2020/0065672 | A1* | 2/2020 | Osband ................ G06N 3/0445 |

FOREIGN PATENT DOCUMENTS

| | | |
|---|---|---|
| CN | 102402712 A | 4/2012 |
| CN | 103065191 A | 4/2013 |
| CN | 106910351 A | 6/2017 |
| JP | 5130374 B2 | 2/2011 |

OTHER PUBLICATIONS

Eiben A. E. et al: "Reinforcement Learning for Online Control of Evolutionary Algorithms", In: "Engineering Self-Organising Systems", Springer Berlin Heidelberg, Berlin, Heidelberg, 033344, XP055540728, ISBN: 978-3-540-69867-8, vol. 4335, pp. 151-160, DOI: 10.1007/978-3-540-69868-5 10, chapter 3; 2007.
International Search Report for application No. PCT/EP2018/078285 dated Jan. 18, 2019.
Office Action in corresponding Korean Patent Application No. 10-2020-7015583 dated Aug. 26, 2020. 4 pages.
Ying-Ying, Su et al., "A process task allocation method based on a neural network enhanced learning algo-rithm," Journal of Northeastern University (Science); vol. 30; No. 2; 2009; 4 pages.
Office Action in corresponding Chinese Patent Application No. 201880070857.7 dated Oct. 22, 2020. 5 pages.
Notice of Allowance in corresponding Korean Patent Application No. 10-2020-7015583 dated Oct. 29, 2020.

* cited by examiner

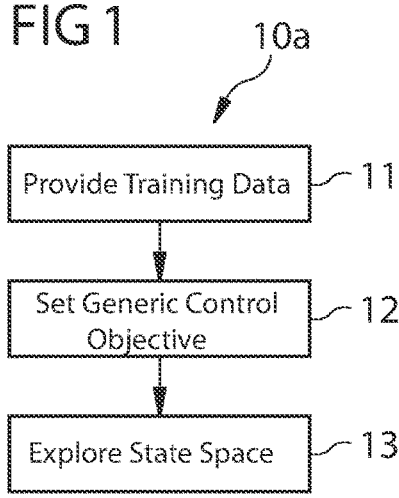
FIG 1
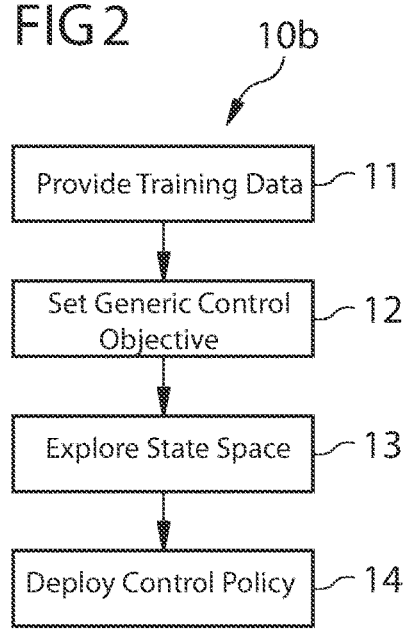
FIG 2
FIG 3  Prior Art
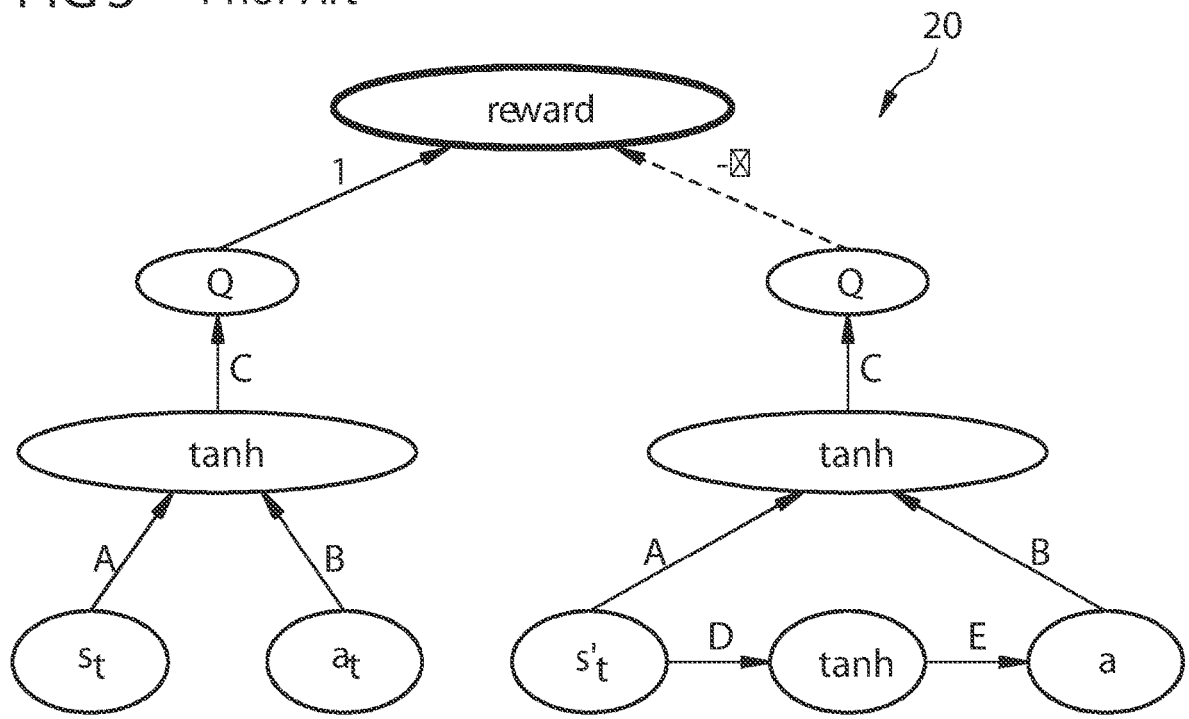

| 41 | 42 | 43 | 44 |
|---|---|---|---|
| 0 | $s_0 \in S$ | | $a_0 \in A$ |
| 1 | $s_1 \in S$ | | $a_1 \in A$ |
| 2 | $s_2 \in S$ | | $a_2 \in A$ |
| 3 | $s_3 \in S$ | | $a_3 \in A$ |
| ... | ... | | ... |

(table 40)

Control Device (51), 50

RANDOMIZED REINFORCEMENT LEARNING FOR CONTROL OF COMPLEX SYSTEMS

FIELD OF THE INVENTION

Various embodiments of the invention relate to a method of controlling a complex system, and to a gas turbine being controlled by the method.

BACKGROUND OF THE INVENTION

Complex systems may be characterized by a multi-dimensional state space established by a plurality of key operating parameters, and potential transitions between these system states in response to changing system state and/or control actions.

Control of such systems may require a control policy which corresponds to a mapping of appropriate control actions to system states or, in other words, trajectories of an "agent" (i.e., a generalization of an operating point) traveling within the state space according to the mapping.

Complex systems such as gas turbines, whose system state comprises turbine as well as ambient conditions, usually entail operation under one of a few finite control policies. Since turbine conditions may also include individual parameters of a turbine, such as a wear level, each gas turbine requires dedicated control policies.

Determining optimal control policies may be too time consuming in systems having large state spaces or impossible in systems having partially known state spaces. Accordingly, approximation techniques such as adaptive dynamic programming or Reinforcement Learning (RL) with function approximation have been used to learn a best possible control policy from given training data.

Changing generic control objectives, such as trading emissions for dynamics of the combustion process, during deployment of gas turbines usually involves a more or less "hard" switching between these finite control policies. This may entail waiting for the right moment to do so, to minimize impact on operation, halting the control of the system for substituting the control policy, during which time period no control may be exerted, and/or providing a plurality of finite control policies for gradations between generic control objectives.

In addition, it is sometimes difficult to distinguish the effects of changing system state and performed control actions due to their high correlation. This may entail performing incorrect control actions. In prior art, this issue has been addressed by acquiring training data during manual sweeps of the controls while maintaining other turbine and ambient conditions, or by manual selection of turbine state based on time ranges and/or operating conditions, or by subsampling turbine state from multiple years of plant operation.

BRIEF SUMMARY OF THE INVENTION

In view of the above, there is a continued need in the art for a method of controlling a complex system such as a gas turbine being controlled by such a method which address some of the above needs.

According to a first aspect, a method is provided. The method comprises providing training data, which training data represents at least a portion of a state space of a complex system; setting a generic control objective for the system and a corresponding set point; and exploring the state space, using Reinforcement Learning, for a control policy for the system which maximizes an expected total reward. The expected total reward depends on a randomized deviation of the generic control objective from the corresponding set point.

Advantageously, the method improves an approximation of a function of expected total reward, or equivalently, a training of a control device with respect to the wanted control policy, in a number of respects. In particular, the same training data set is used for training with changing generic control objectives, resulting in the training data set being explored more efficiently because of the changing control objectives, and thus improving data efficiency during training. Training also becomes more stable, as the randomization enforces optimizing for different generic control objectives for the same system state. In particular, a control policy, once determined, may easily be adapted to changing generic control objectives during operation. For example, trading emissions for combustion stability becomes possible without substituting the actual policy. In particular, a control policy, once determined, may better distinguish between effects caused by performed control actions and by changing system state, respectively, because changing generic control objectives influence the expected total reward and the wanted control policy independently of the changing system state.

For example, the generic control objective of controlling $NO_x$ concentration in an exhaust gas of a gas turbine may involve an actual value of the generic control objective of 30 ppm and a corresponding set point at 25 ppm. For randomization, a random term of +/−10 ppm is provided. Then, the randomized deviation may amount to 30 ppm-25 ppm+/−10 ppm=15 . . . (−5) ppm. Multiple generic control objectives may be controlled at the same time. In addition, there may be several set points for a generic control objective.

The term "state space" as used herein refers to a multi-dimensional definition space S of a complex control problem, as defined by conditions of the complex system under control (i.e., system conditions) and of the environment of the system (i.e., ambient conditions). At a time instant t, the system adopts a particular state $s_t \in S$, and during deployment, the system may undergo a sequence of state transitions in the state space owing to changing system conditions and/or changing ambient conditions. For example, for different types and kinds of control systems, different kinds and types of state spaces may be encountered. Specifically, the dimensions of the state space may vary. For example, if the complex system is implemented by a gas turbine, the dimensions of the state space may include one or more of the following: operational temperature of the gas turbine; revolution rate of the gas turbine; flow per time unit; power consumption; output power. Generally, the dimensions of the state space may comprise: speed; temperature; pressure; flow; throughput; input power; output power; etc.

The term "complex system" as used herein refers to systems whose behavior is intrinsically difficult to model, for example due to inherent nonlinearities, chaotic behavior and/or interactions between the system and its environment. The complex system may include multiple actuators and/or sensors. The complex system may be a physical system or a computer-implemented system. In other words, a complex system may be difficult to control. The complex systems considered herein may be described as Markovian decision processes (MDP), which represent networks in which nodes (states) are interconnected by links (state transitions), and the state transitions occur according to probabilities which merely depend on the current state adopted by the system.

The terms "generic control objective" or "target" as used herein refers to a process value of a system under control, which stands for an overall objective of control. For example, in case of gas turbines, these may include reducing emissions, maintaining combustion dynamics, increasing efficiency, or maintaining turbine load.

The term "set point" as used herein refers to a desired value for a process value of a system under control.

The term "exploring the state space" as used herein refers to exploring the underlying MDP network of the complex system on the basis of given training data, which usually represents a subset of the state space S.

The term "Reinforcement Learning" (RL) as used herein refers to an area of machine learning concerned with how "agents" (i.e., generalized operating points) ought to take actions, which potentially result in state transitions, in an environment (i.e., state space) so as to maximize some notion of cumulative reward. In the field of optimal control, the environment is typically formulated as an MDP, which may be optimally solved by dynamic programming techniques. Reinforcement Learning targets large MDPs where exact methods become infeasible, and is also being referred to as approximate dynamic programming.

The term "expected total reward" as used herein refers to a cumulative reward arising from the entirety of future state transitions within the state space. In an MDP, the expected total reward may recursively be calculated as a sum of the reward for the current state transition $s_t \rightarrow s_{t+1}$ and the reward for the remaining future state transitions.

Depending on the particular kind and type of the complex system, it is possible that different kinds and types of rewards are considered. For example, if the complex system is a power plant, e.g., a gas turbine or a nuclear power plant, the total reward may relate to the produced power and/or emissions. There may be a tendency to maximize produced power and minimize emissions. For example, if the complex system is a subsea factory, the total reward may be a mean-time-between-failure. Generally, the total reward may be selected from the group comprising: mean-time-between-failure; wear out; energy consumption; produced power; produced output in arbitrary units; processed pieces, e.g., in a factory, etc.; reliability of operation; etc.

The term "control policy" as used herein refers to a mapping a(s) of an appropriate control action a∈A from a set of available control actions A to individual system states s∈S of the state space S. In other words, starting from a given system state $s_0$, a control policy defines a trajectory of an "agent" (i.e., a generalization of an operating point) traveling within the state space according to the mapping.

The term "maximize" as used herein refers to obtaining an expected total reward which obtains an extreme value or, at least, comes close to an extreme value. For example, said maximization of the expected total reward may be subject to one or more constraints; without such constraints, an even more extreme value may be obtained, but due to the constraints the maximization is bound to remain at a certain threshold.

The term "randomized" as used herein refers to adding a term which represents a random number in a value range centered at the origin (i.e., zero). This term encompasses pseudo-randomization techniques.

The term "deviation" as used herein refers to a mathematical difference between two terms. For example, a deviation between terms A and B may be expressed by the term A-B. Other metrics may be applied to quantify the difference.

In particular, in case of multiple generic control objectives, the expected total reward may depend on multiple randomized deviations of the respective generic control objective from the respective corresponding set point.

According to some embodiments, the randomized deviation of the generic control objective from the corresponding set point comprises a scaled random number.

The term "scaled random number" as used herein refers to the added term which represents a random number in a value range centered at the origin (i.e., zero), and is scaled to match given upper and lower bounds for the value range. For example, as drawing random numbers from a random number generator usually yields real numbers $r \in [0;1]$, a scaled random number in a value range of +/−S may be obtained by the term $2 \cdot S \cdot (r-0,5)$. Drawing a series of consecutive scaled random numbers results is a time series which has noise-like properties, and may thus be considered as scaled random noise.

According to some embodiments, a maximum magnitude of the scaled random number is a fraction of a magnitude of the corresponding set point.

For example, the maximum magnitude of the scaled random number may be +/−0.3 times the magnitude of the corresponding set point.

The term "magnitude" as used herein refers to an output value of a mathematical magnitude function when applied to an input variable. For example, in case of an input scalar, the magnitude function returns the scalar without its sign. In case of an input vector, the magnitude function returns the vector's length.

Advantageously, randomizing the deviation may, depending on the magnitude of the scaled random number, enforce a change of sign of the randomized deviation. Consequently, the exploring of the state space for the wanted control policy may entail exploring the state space in different directions. This is particularly true in case of multiple generic control objectives. In particular, fixing a ratio of magnitudes of the scaled random numbers and the corresponding set point enables a change of sign of the randomized deviation.

According to some embodiments, the generic control objective for the system and the corresponding set point are scalable in magnitude.

Advantageously, this enables incorporating multiple generic control objectives by normalizing the respective generic control objective.

According to some embodiments, the control policy comprises a sequence of state transitions in the state space, each of the state transitions entailing a corresponding reward, and the expected total reward comprising a sum of the corresponding rewards of the sequence of state transitions of the control policy.

Advantageously, this enables decomposing a training of an approximation function of the expected total reward into a plurality of training steps, each concerned with determining a reward for an individual state transition in the sequence of state transitions of the wanted control policy.

According to some embodiments, the corresponding reward for each state transition of the sequence of state transitions is approximated by a neural network (an artificial neural network implemented by program code and/or hardware). For example, a convolutional neural network may be used. Techniques of deep learning may be employed. The neural network may include multiple layers, including hidden layers, pooling layers, fully-connected layers, convolutional layers, etc.

Advantageously, using a neural network for training of an approximation function of the expected total reward enables using well-known methods for function approximation, such as backpropagation.

According to some embodiments, the exploring of the state space of the system is performed using a policy gradient method.

Advantageously, policy gradient methods are model-free, meaning that they do not require modeling as an intermediate step for deriving the wanted control policy.

The term "policy gradient method" as used herein refers to a class of methods which derive a wanted control policy directly from the underlying MDP.

According to some embodiments, the exploring of the state space of the system is performed using Policy Gradient Neural Rewards Regression.

The term "Policy Gradient Neural Rewards Regression" as used herein refers to a class of methods which derive a direct representation of an approximation function of the expected total reward (and therefore the wanted control policy). In particular, the approximation function is learned by a neural network.

According to some embodiments, the exploring of the state space of the system comprises supplying the randomized deviation of the generic control objective from the corresponding set point as an input of the neural network.

Advantageously, the neural network approximates the function of the expected total reward in dependence on the randomized deviation of the generic control objective from the corresponding set point.

According to some embodiments, the method further comprises deploying the control policy to control the system, wherein the deploying the control policy comprises supplying a deviation of the generic control objective from the corresponding set point as an input of the neural network. In other words, during training of the wanted control policy, the calculated deviation is randomized.

Advantageously, the neural network renders the approximated function of the expected total reward in dependence on the deviation of the generic control objective from the corresponding set point. In other terms, during deployment of the control policy, the calculated deviation is not randomized.

The terms "deploying the control policy" and "deployment of the system" as used herein refer to putting the control policy or the system into live operation for delivering business value.

According to some embodiments, deploying the control policy to control the system further comprises setting the set point to a fixed value.

Advantageously, setting the set point to a fixed value, or in case of multiple generic control objectives, setting the multiple corresponding set points to fixed values, ensures maximum compatibility to known implementations.

According to some embodiments, the training data comprises system conditions, ambient conditions, and performed control actions recorded as time series at discrete time instants during deployment of the system.

The term "system conditions" as used herein refers to a plurality of key operating parameters of the system under control, which may be acquired by means of measurements, such as load and wear level.

The term "ambient conditions" as used herein refers to a plurality of key operating parameters of the environment of the system under control, for example air temperature and humidity.

Advantageously, available training data in the form of tables or comma-separated values may be used for training of the wanted control policy.

According to a second aspect, a computer program product is provided. The product comprises software code for performing the steps of the method of various embodiments when said product is run on a computer.

Advantageously, the technical effects and advantages described above in relation with the method for equally apply to the computer program product having corresponding features.

According to a third aspect, a gas turbine is provided. The gas turbine comprises a control device configured to perform the method of any one of the preceding claims.

BRIEF DESCRIPTION OF THE DRAWINGS

Embodiments of the invention will be described with reference to the accompanying drawings, in which the same or similar reference numerals designate the same or similar elements.

FIG. 1 is a schematic diagram for illustrating a method according to an embodiment.

FIG. 2 is a schematic diagram for illustrating a method according to a further embodiment.

FIG. 3 is a schematic diagram for illustrating a neural network topology according to prior art.

DETAILED DESCRIPTION OF EMBODIMENTS

Figure 4:
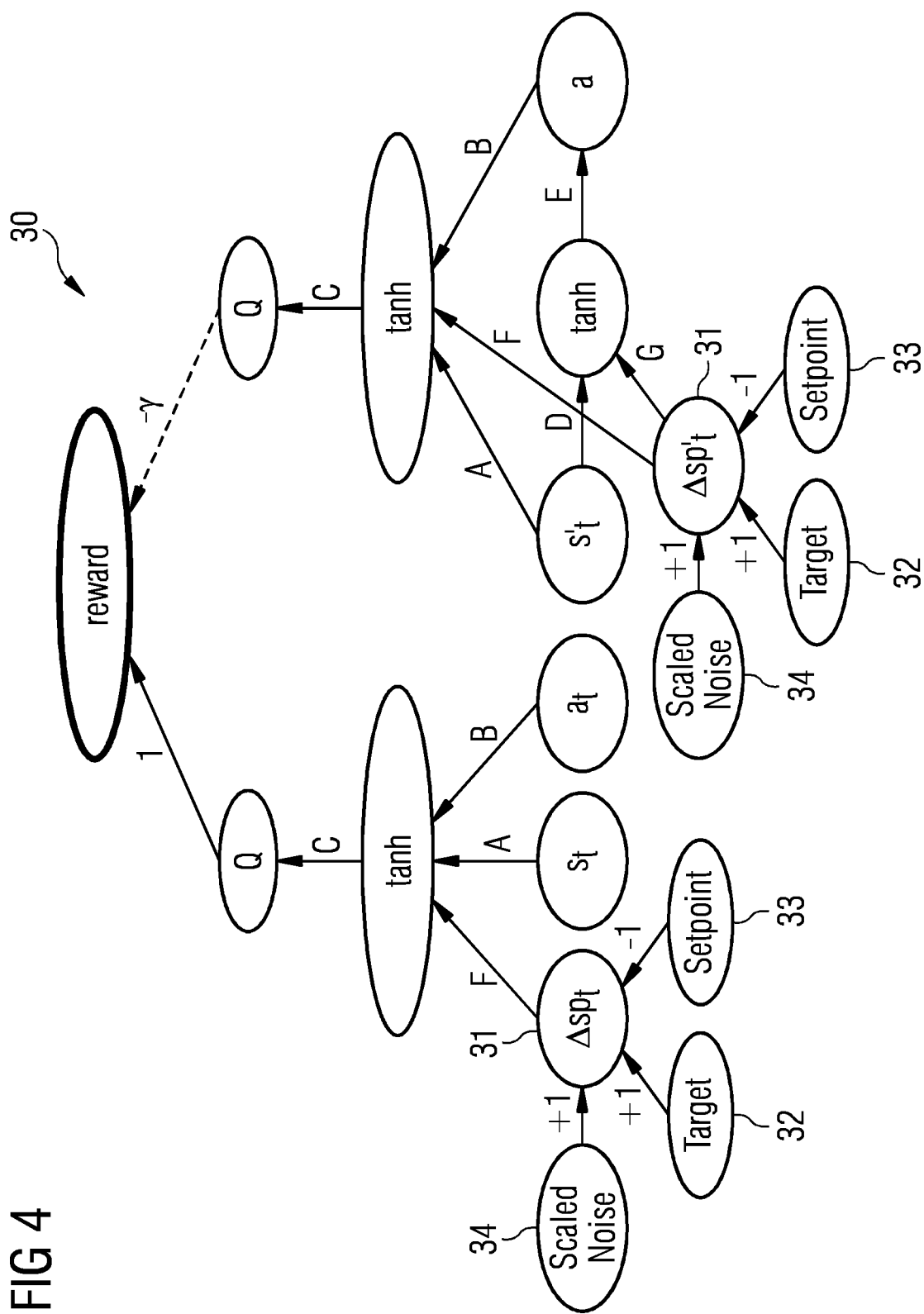
FIG. 4 is a schematic diagram for illustrating a neural network topology deployed in the method according to various embodiments.

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

The drawings are to be regarded as being schematic representations and elements illustrated in the drawings are not necessarily shown to scale. Rather, the various elements are represented such that their function and general purpose become apparent to a person skilled in the art.

FIG. 1 is a schematic diagram for illustrating a method 10a according to an embodiment.

The method 10a comprises the steps of: providing 11 training data 40, which training data 40 represents at least a portion of a state space S of a complex system 50; setting 12 a generic control objective 32 for the system 50 and a corresponding set point 33; and exploring 13 the state space S, using Reinforcement Learning, for a control policy for the system 50 which maximizes an expected total reward. The expected total reward depends on a randomized deviation 31 of the generic control objective 32 from the corresponding set point 33.

The control policy comprises a sequence of state transitions in the state space S, each of the state transitions entailing a corresponding reward. The expected total reward comprises a sum of the corresponding rewards of the sequence of state transitions of the control policy.

FIG. 2 is a schematic diagram for illustrating a method 10b according to a further embodiment.

In addition to the method 10a, the method 10b further comprises the step of: deploying the control policy 14 to control the system. This step comprises supplying a deviation of the generic control objective 32 from the corresponding set point 33 as an input of the neural network 30, and may selectively comprise setting the set point 33 to a fixed value. In other words, the deviation of the generic control objective 32 from the corresponding set point 33 is not randomized by adding a scaled random number during deployment of the control policy, once it is determined.

FIG. 3 is a schematic diagram for illustrating a neural network topology 20 according to prior art.

The topology 20 has, as shown at the lower end of FIG. 3, state $s_t$, action $a_t$ and follow-on state $s_t'=s_{t+1}$ as inputs, and the so-called quality function Q as outputs. Inputs and outputs are interconnected via weight matrices A-E and a hyperbolic tangent as an activation function.

The quality function Q measures goodness of state-action pairs. For example, the left-hand side of FIG. 3 represents goodness of the state-action pair $s_t$, $a(s_t)=a_t$ at time instant t, and the right-hand side represents goodness of the state-action pair $s_t'=s_{t+1}$, $a(s_t')=a_{t+1}$, wherein indices t and t+1 respectively stand for variables at time instant t (current state) and at time instant t+1 (follow-on state).

In other words, the left-hand side and right-hand side of FIG. 3 denote the respective goodness of consecutive steps $s_t$ and $s_{t+1}$ under the wanted control policy $a(s \in S)$, which determines which action $a \in A$ of the available actions A to choose from in a particular state s.

Thus, it is apparent from topology 20 that each state transition $s_t \to s_{t+1}$ entails a corresponding reward shown at the top of FIG. 3 which is given by the difference between the left-hand side and right-hand side of FIG. 3. The discount factor $0<\gamma<1$ is merely responsible for ensuring convergence.

FIG. 4 is a schematic diagram for illustrating a neural network topology 30 deployed in the method according to various embodiments.

FIG. 4 shows that the topology 30 has additional inputs with respect to the topology 20 of FIG. 3.

The additional inputs represent randomized deviations 31, from which weight matrices F-G lead into respective activation functions. As a result, the expected total reward approximated by the topology 30 also depends on the randomized deviation 31.

Each randomized deviation 31 depicted in FIG. 4 comprises a deviation of a generic control objective (or target) 32 from a corresponding set point 33, as well as a scaled random number 34 (a time series thereof behaving like noise), a maximum magnitude of which being a fraction of a magnitude of the corresponding set point 33. For example, the maximum magnitude of the scaled random number 34 may be +/−0.3 times the magnitude of the corresponding set point 33.

In case of multiple generic control objectives 32, the respective generic control objective 32 for the system 50 and the respective corresponding set point 33 are scalable in magnitude.

The neural network topology 30 approximates the corresponding reward for each state transition of the sequence of state transitions of the wanted control policy by exploring 13 the state space S of the system 50 using a policy gradient method, in particular using Policy Gradient Neural Rewards Regression.

To this end, the exploring 13 of the state space S of the system 50 comprises supplying the randomized deviation 31 of the generic control objective 32 from the corresponding set point 33 as an input of the neural network 30.

On the other hand, the deploying of the control policy comprises supplying a deviation of the generic control objective 32 from the corresponding set point 33 as an input of the neural network 30, without any randomization.

Figures 5, 6:
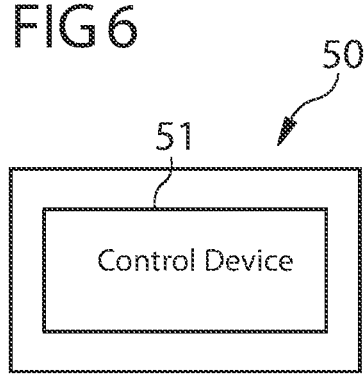
FIG. 5 is a schematic diagram for illustrating exemplary training data used in the method according to various embodiments.
FIG. 6 is a schematic diagram illustrating a gas turbine according to an embodiment.

FIG. 5 is a schematic diagram for illustrating exemplary training data 40 used in the method according to various embodiments.

The depicted table is one possible representation of the training data 40 besides comma-separated values or database storage.

The training data 40 comprises system conditions 42 and ambient conditions 43 of the system 50 to be controlled, as well as performed control actions 44 recorded as time series 42, 43, 44 at discrete time instants 41 during deployment of the system 50. The system conditions 42 and ambient conditions 43 collectively represent the acquired fraction of the state space S, from which the wanted control policy is to be determined.

FIG. 6 is a schematic diagram illustrating a gas turbine 50 according to an embodiment.

The gas turbine 50 comprises a control device 51 configured to perform the method 10a; 10b according to various embodiments.

The control device 51, including the neural network 30 shown in FIG. 4, may be trained, based on training data 40 shown in FIG. 5, in order to determine the wanted control policy that maximizes the expected total reward. Once determined, the control policy defines a mapping of a control action $a \in A$ from a set of available control actions A to individual system states $s \in S$ of the state space S. In other words, the control device 51 then has the information which control action to perform in each state s, and under one or more generic control objectives, in order to maximize the expected total reward, or equivalently, to optimally control the underlying gas turbine 50.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, while above various examples have been described for a complex system implemented by a gas turbine, the techniques described herein may be readily applied to other kinds and types of complex systems. Examples of complex systems include: subsea equipment and factory; communication networks; medical equipment including imaging tools such as magnetic resonance imaging devices or computer tomography devices; power plants such as nuclear power plants or coal power plants; etc.

The invention claimed is:

1. A method comprising:
providing training data that represents at least a portion of a state space of a complex system; and
exploring the state space, using Reinforcement Learning, for a control policy for the complex system which maximizes an expected total reward;
wherein:
prior to exploring the state space, setting a generic control objective for the complex system and a corresponding set point, the corresponding set point being a desired value for a process value of the complex system under control; and the expected total reward is dependent on a randomized deviation of the generic control objective from the corresponding set point.

2. The method of claim 1, wherein the randomized deviation of the generic control objective from the corresponding set point comprises a scaled random number.

3. The method of claim 2, wherein a maximum magnitude of the scaled random number is a fraction of a magnitude of the corresponding set point.

4. The method of claim 1, wherein the generic control objective for the complex system and the corresponding set point are scalable in magnitude.

5. The method of claim 1, wherein the control policy comprises a sequence of state transitions in the state space, each of the state transitions entailing a corresponding reward, and the expected total reward comprising a sum of the corresponding rewards of the sequence of state transitions of the control policy.

6. The method of claim 5, wherein the corresponding reward for each state transition of the sequence of state transitions is approximated by a neural network.

7. The method of claim 6, wherein the exploring of the state space is performed using a policy gradient method.

8. The method of claim 7, wherein the exploring of the state is performed using Policy Gradient Neural Rewards Regression.

9. The method of claim 8, wherein the exploring of the state comprises supplying the randomized deviation of the generic control objective from the corresponding set point as an input of the neural network.

10. The method of a claim 1, further comprising
deploying the control policy to control the complex system, wherein deploying the control policy to control the complex system comprises supplying a deviation of the generic control objective from the corresponding set point as an input of a neural network.

11. The method of claim 10, wherein deploying the control policy to control the complex system further comprises setting the set point to a fixed value.

12. The method of claim 1, wherein the training data comprises system conditions, ambient conditions, and performed control actions recorded as time series at discrete time instants during deployment of the complex system.

13. A computer program product comprising software code for performing the steps of the method of claim 1 when the computer program product is run on a computer.

14. A gas turbine, comprising
a control device configured to perform the method of claim 1.

* * * * *